(12) United States Patent
Funayama

(10) Patent No.: US 7,929,796 B2
(45) Date of Patent: Apr. 19, 2011

(54) IMAGE PROCESSING SYSTEM AND METHOD, AND TERMINAL AND SERVER USED FOR THE SAME

(75) Inventor: Chisato Funayama, Tokyo (JP)

(73) Assignee: NEC Corporation, Tokyo (JP)

( * ) Notice: Subject to any disclaimer, the term of this patent is extended or adjusted under 35 U.S.C. 154(b) by 1077 days.

(21) Appl. No.: 11/662,132

(22) PCT Filed: Sep. 7, 2005

(86) PCT No.: PCT/JP2005/016385
§ 371 (c)(1),
(2), (4) Date: Mar. 7, 2007

(87) PCT Pub. No.: WO2006/028108
PCT Pub. Date: Mar. 16, 2006

(65) Prior Publication Data
US 2007/0255456 A1 Nov. 1, 2007

(30) Foreign Application Priority Data
Sep. 7, 2004 (JP) .................................. 2004-259582

(51) Int. Cl.
G06K 9/40 (2006.01)
G06K 9/00 (2006.01)
(52) U.S. Cl. ........................................ 382/274; 382/106
(58) Field of Classification Search .................. 382/309
See application file for complete search history.

(56) References Cited

U.S. PATENT DOCUMENTS

| | | | | |
|---|---|---|---|---|
| 4,661,692 A * | 4/1987 | Kawasaki | ................. | 250/201.2 |
| 5,315,342 A * | 5/1994 | Cocca | ............................ | 396/104 |
| 5,589,875 A * | 12/1996 | Fujita et al. | ................... | 348/143 |
| 6,739,767 B2 * | 5/2004 | Ikeda et al. | .................... | 396/567 |
| 6,791,566 B1 * | 9/2004 | Kuratomi et al. | ............. | 345/589 |
| 6,801,296 B2 * | 10/2004 | Ikeda et al. | ...................... | 355/38 |
| 6,940,556 B1 * | 9/2005 | Tamune | ........................ | 348/350 |
| 7,145,597 B1 * | 12/2006 | Kinjo | ......................... | 348/222.1 |
| 7,526,120 B2 * | 4/2009 | Gokturk et al. | ............... | 382/154 |
| 7,616,233 B2 * | 11/2009 | Steinberg et al. | .......... | 348/222.1 |
| 7,751,643 B2 * | 7/2010 | Zavadsky et al. | ............. | 382/274 |
| 2002/0140981 A1 * | 10/2002 | Takemoto | .................... | 358/1.18 |
| 2002/0176711 A1 * | 11/2002 | Shizukuishi | .................. | 396/320 |
| 2003/0020824 A1 * | 1/2003 | Ito et al. | ........................ | 348/345 |

(Continued)

FOREIGN PATENT DOCUMENTS

JP 3-38986 2/1991

(Continued)

*Primary Examiner* — Vikkram Bali
*Assistant Examiner* — Michelle Entezari
(74) *Attorney, Agent, or Firm* — Scully, Scott, Murphy & Presser, PC

(57) ABSTRACT

An imaging unit (1) images an imaging object and acquires image data. On the other hand, imaging information which is information at the time of imaging is acquired by an imaging information acquisition unit (2). A storage unit (3) contains image correction information for correcting the acquired image. An imaging information analysis unit (4) analyzes the imaging object and the imaging condition from the imaging information given from the imaging information acquisition unit (2) and reads out image correction information appropriate for the acquired image from the storage unit (3). An image processing unit (5) subjects the image data on the imaging object obtained by the imaging unit (1) to a correction process according to the image correction information obtained by the image correction information acquisition unit (4).

26 Claims, 11 Drawing Sheets

U.S. PATENT DOCUMENTS

2004/0027456 A1* 2/2004 Pierce .......................... 348/175
2005/0041103 A1* 2/2005 Kinjo ......................... 348/207.1

FOREIGN PATENT DOCUMENTS

| | | |
|---|---|---|
| JP | 5-7329 | 1/1993 |
| JP | 5-49034 | 2/1993 |
| JP | 5-308563 | 11/1993 |
| JP | 2001-92956 | 4/2001 |
| JP | 2002-297753 | 10/2002 |
| JP | 2003-87815 | 3/2003 |
| JP | 2003-153296 | 5/2003 |
| JP | 2003-244528 | 8/2003 |
| JP | 2003-244709 | 8/2003 |
| JP | 2003-281511 | 10/2003 |
| JP | 2005-328271 | 11/2005 |

* cited by examiner

IMAGE PROCESSING SYSTEM AND METHOD, AND TERMINAL AND SERVER USED FOR THE SAME

APPLICABLE FIELD IN THE INDUSTRY

The present invention relates to a technology of an image process, and more particularly to an image processing system for obtaining information associated with imaging and for performing an optimal image correction process for a photo image based upon its information and a method, and a terminal, a server, etc. used for the same.

BACKGROUND ART

Conventionally, there exists a technology of appropriately regulating the setting of an iris, a shutter speed, a white balance, etc. before imaging, depending upon an imaging target (a figure/flower) or a state (outdoor scene/night scene) of an object for the purpose of obtaining an appropriate photo image, irrespective of a silver salt film camera or a digital camera. Such a technology is called a scene select, and for example, in a case of imaging a sport, upon selecting a mode of a sport scene, the sport is imaged at a shutter speed as highest as possible, thereby enabling a figure that is fast in motion to be imaged in a stationary state. However, from a viewpoint of difficulty in setting, a numerous number of the conditions cannot be set to the imaging condition, and only a general-use setting value is prepared for a typical imaging condition, whereby the effect for the actual imaging condition that is multifarious is not so high.

On the other hand, there exists a technology of converting the photo image in to an appropriate one by regulating/correcting brightness or a tone thereof upon viewing the actual image after imaging. In this technology, after imaging, the photo image is developed into an information processing unit such as a computer to subject the photo image to an image process. At this time, performing the process necessitates having a medium for performing the process and image processing soft, and in addition, the photo image includes the image that is difficult to correct with inexpensive image processing soft that a general user uses, whereby as a result, the effect of the entire image correction is not so high. In addition hereto, the image process, and in particular, the correction process of the image necessitates a professional knowledge, which makes it difficult for a general user to perform an appropriate correction process.

Thereupon, the technology has been proposed of subjecting the photo image to an image process without burdening a user (for example, Patent document 1).

The technology disclosed in the Patent document 1 is as follows: as shown in FIG. 11, imaging information J0 is read in an imaging information obtainment means 12 from the image data S0 appended with the imaging information J0 including an imaging location and time, and on the basis of the imaging information J0, a first image processing condition G1 is set in a first image processing condition setting means 13. On the other hand, on the basis of the image data S0, a second image processing condition G2 is set in a second image processing condition setting means 14. A final image processing condition GF0 is set from the image processing conditions G1 and G2 in a final image processing condition setting means 15, and the image processing is applied to the image data S0 on the basis of the final image processing condition GF0 to obtain the processed image data S1.

Patent document 1: JP-P2003-281511A

DISCLOSURE OF THE INVENTION

Problems to be Solved by the Invention

However, there exists a limit to the image processing in the setting of the image processing condition by the first image processing condition setting means 13 has, so the setting of the image processing condition by the second image processing condition setting means 14 is also taken into consideration so as to making up for its limit.

The reason is that the first image processing condition setting means 13 analyzes only the imaging time, whether the imaging location is an indoor one or an outdoor one, or the like on the basis of the imaging information J0 to set the image processing condition without analyzing the detailed imaging condition, or the imaging object itself.

Thereupon, the present invention has been accomplished in consideration of the above-mentioned problems, and an object thereof is to provide an image processing technology that is capable of, by analyzing imaging information to get an imaging object and an imaging condition, correcting a photo image according to appropriate image correction information that corresponds hereto.

Means to Solve the Problem

The first invention for solving the above-mentioned problem, which is an image processing system, is characterized in including: storage means having image correction information for correcting image data stored; imaging information obtainment means for obtaining imaging information; imaging means for, by imaging an imaging object, obtaining image data of the imaging object; imaging information analysis means for analyzing the imaging information obtained in the imaging information obtainment means, thereby to obtain image correction information of the image data from the storage means; and image processing means for, based upon the image correction information obtained in the imaging information analysis means, correction-processing the image data obtained in the imaging means.

The second invention for solving the above-mentioned problem, which is an image processing system, is characterized in including: storage means having image correction information for correcting image data stored; imaging information obtainment means for obtaining imaging information; imaging means for, by imaging an imaging object, obtaining image data of the imaging object; imaging information analysis means for analyzing the imaging information obtained in the imaging information obtainment means to get an imaging object or an imaging condition, and for obtaining image correction information that corresponds to this imaging object or imaging condition from the storage means; and image processing means for, based upon the image correction information obtained in the imaging information analysis means, correction-processing the image data obtained in the imaging means.

The third invention for solving the above-mentioned problem, which is an image processing system, is characterized in including: storage means having image correction information, being correction information for correcting a photo image, and an imaging object or an imaging condition, for which this image correction information is applied, stored correspondingly; imaging information obtainment means for obtaining imaging information; imaging means for, by imaging an imaging object, obtaining image data of the imaging object; imaging information analysis means for analyzing the imaging information obtained in the imaging information obtainment means to get an imaging object or an imaging condition, and for obtaining image correction information that corresponds to this imaging object or imaging condition from the storage means; and image processing means for, based upon the image correction information obtained in the imaging information analysis means, correction-processing the image data obtained in the imaging means.

The fourth invention for solving the above-mentioned problem, which is an image processing system, is characterized in including: an image correction information database having image correction information, being correction information for correcting a photo image, and an imaging object or an imaging condition, for which this image correction information is applied, stored correspondingly; an imaging information database having imaging information and an imaging object or an imaging condition stored correspondingly; imaging information obtainment means for obtaining imaging information; imaging means for, by imaging an imaging object, obtaining image data of the imaging object; imaging information analysis means for retrieving an imaging object or an imaging condition that corresponds to the imaging information obtained in the imaging information obtainment means from the imaging information database, and for obtaining image correction information that corresponds to this imaging object or imaging condition from the image correction information database; and image processing means for, based upon the image correction information obtained in the imaging information analysis means, correction-processing the image data obtained in the imaging means.

The fifth invention for solving the above-mentioned problem, which is an image processing system, is characterized in including: storage means having image correction information for correcting image data stored; imaging information obtainment means for obtaining imaging information; imaging information analysis means for analyzing the imaging information obtained in the imaging information obtainment means, thereby to obtain image correction information of the image data from the storage means; and image processing means for, based upon the image correction information obtained in the imaging information analysis means, correction-processing the image data obtained in the imaging means.

The sixth invention for solving the above-mentioned problem is characterized in that in one of the above-mentioned first invention to fifth invention, the imaging information obtainment means is means for obtaining information of an imaging position.

The seventh invention for solving the above-mentioned problem is characterized in that in one of the above-mentioned first invention to sixth invention, the imaging information obtainment means is means for obtaining information of an imaging date.

The eighth invention for solving the above-mentioned problem is characterized in that in one of the above-mentioned first invention to seventh invention, the imaging information obtainment means is means for obtaining information of weather at the time of imaging.

The ninth invention for solving the above-mentioned problem is characterized in that in one of the above-mentioned first invention to eighth invention, the imaging information obtainment means is means for obtaining information of an imaging angle.

The tenth invention for solving the above-mentioned problem is characterized in that in one of the above-mentioned first invention to ninth invention: the image correction information is image information of the imaging object and color expression information satisfactory for this image; and the image processing means is configured to employ the image information of the imaging object at the time of the correction process, thereby to identify the imaging object, being a target, and to employ the satisfactory color expression information, thereby to correct the image of the imaging object, being a target.

The eleventh invention for solving the above-mentioned problem, which is an image processing method, is characterized in obtaining imaging information at the time of imaging, analyzing this imaging information, thereby to get an imaging object or an imaging condition, retrieving image correction information that corresponds to this imaging object or imaging condition from the accumulated image correction information, and correction-processing the photo image based upon this image correction information.

The twelfth invention for solving the above-mentioned problem, which is an image processing method, is characterized in obtaining imaging information at the time of imaging, analyzing this imaging information, thereby to get an imaging object or an imaging condition, retrieving image correction information that corresponds to this imaging object or imaging condition from the image correction information accumulated responding to the imaging object or the imaging condition, and correction-processing the photo image based upon this image correction information.

The thirteenth invention for solving the above-mentioned problem, which is an image processing method, is characterized in pre-accumulating information of a location and an image correction, searching the accumulated information based upon the imaging position, thereby to extract information of an image correction that corresponds hereto, and employing the information of the image correction, thereby to correction-process the photo image.

The fourteenth invention for solving the above-mentioned problem, which is an image processing method, is characterized in pre-accumulating information of a location, a date, and an image correction, searching the accumulated information based upon the imaging position and the imaging date, thereby to extract information of an image correction that corresponds hereto, and employing the information of the image correction, thereby to correction-process the photo image.

The fifteenth invention for solving the above-mentioned problem, which is an image processing method, is characterized in pre-accumulating information of a location, a date, weather and an image correction, searching the accumulated information based upon the imaging position, the imaging date and the weather at the time of imaging, thereby to extract information of an image correction that corresponds hereto, and employing the information of the image correction, thereby to correction-process the photo image.

The sixteenth invention for solving the above-mentioned problem, which is an image processing method, is characterized in pre-accumulating information of a location, a date, weather, an angle, and an image correction, searching the accumulated information based upon the imaging position, the imaging date, the weather at the time of imaging, and the imaging angle, thereby to extract information of an image correction that corresponds hereto, and employing the information of the image correction, thereby to correction-process the photo image.

The seventeenth invention for solving the above-mentioned problem is characterized in that in one of the above-mentioned eleventh invention to sixteenth invention: the image correction information is image information of a body, being a target, and color expression information satisfactory for this image; and the image information of the body is employed at the time of the correction to identify the body, being a target, and the satisfactory color expression information is employed to correct the image of the body, being a target.

The eighteenth invention for solving the above-mentioned problem, which is an image processing system, is characterized in including: a mobile terminal including: imaging means for, by imaging an imaging object, obtaining image data of the imaging object; imaging information obtainment means for obtaining imaging information; image processing means for, based upon image correction information for correcting the transmitted image data, correction-processing the image data; and means for transmitting the imaging information obtained in the imaging information obtainment means; and a server including: storage means having image correction information for correcting image data stored; imaging information analysis means for receiving imaging information from the mobile terminal, analyzing the received imaging information, thereby to get an imaging object or an imaging condition, and obtaining image correction information that corresponds to this imaging object or imaging condition from the storage means; transmission means for transmitting the image correction information obtained in the imaging information analysis means to the mobile terminal.

The nineteenth invention for solving the above-mentioned problem, which is an image processing system, is characterized in including: a mobile terminal including: imaging means for, by imaging an imaging object, obtaining image data of the imaging object; imaging information obtainment means for obtaining imaging information; and means for transmitting the image data obtained in the imaging means and the imaging information obtained in the imaging information obtainment means; and a server including: storage means having image correction information for correcting the image data stored; imaging information analysis means for receiving imaging information from the mobile terminal, analyzing the received imaging information, thereby to get an imaging object or an imaging condition, and obtaining image correction information that corresponds to this imaging object or an imaging condition from the storage means; image processing means for, based upon the image correction information obtained in the imaging information analysis means, correction-processing the received image data; and transmission means for transmitting the image data correction-processed in the image processing means to the mobile terminal.

The twentieth invention for solving the above-mentioned problem, which is a mobile terminal for transmitting photo image data to an external image processing server, and causing it to perform an image process, is characterized in including: imaging means for, by imaging an imaging object, obtaining image data of the imaging object; imaging information obtainment means for obtaining imaging information; means for transmitting the image data of the imaging object and the imaging information by causing them to correspond with each other; and storage means into which the image-processed image data transmitted from the image processing server is contained.

The twenty-first invention for solving the above-mentioned problem, which is a mobile terminal for image-processing photo image data, is characterized in including: imaging means for, by imaging an imaging object, obtaining image data of the imaging object; imaging information obtainment means for obtaining imaging information; means for transmitting the imaging information; means for receiving image correction information of the photo image data that corresponds to the imaging object information; and image processing means for, based upon the obtained image correction information, correction-processing the image data.

The twenty-second invention for solving the above-mentioned problem, which is a mobile terminal, is characterized in including: imaging means for, by imaging an imaging object, obtaining image data of the imaging object; imaging information obtainment means for obtaining imaging information; imaging object information obtainment means for obtaining imaging object information of the imaging object; and containing means for containing the image data of the imaging object and the obtained imaging information into detachable storage means.

The twenty-third invention for solving the above-mentioned problem, which is a server for transmitting image correction information for correcting photo image data to a terminal, is characterized in including: storage means having the image correction information for correcting the image data stored; imaging information analysis means for receiving imaging information that is transmitted from the terminal, analyzing the received imaging information, thereby to get an imaging object or an imaging condition, and obtaining image correction information that corresponds to this imaging object or imaging condition from the storage means; and transmission means for transmitting the image correction information obtained in the imaging information analysis means to the terminal.

The twenty-fourth invention for solving the above-mentioned problem, which is a server for, after correction-processing photo image data that is transmitted from a terminal, transmitting it to the terminal, is characterized in including: storage means having image correction information for correcting the image data stored; imaging information analysis means for receiving imaging information that is transmitted from the terminal, analyzing the received imaging information, thereby to get an imaging object or an imaging condition, and obtaining image correction information that corresponds to this imaging object or imaging condition from the storage means; image processing means for, based upon the image correction information obtained in the imaging information analysis means, correction-processing the received image data; and transmission means for transmitting the image data correction-processed in the image processing means to the terminal.

The twenty-fifth invention for solving the above-mentioned problem, which is a program of an information processing unit for transmitting image correction information for correcting photo image data to a terminal, is characterized in causing the information processing unit to function as: imaging information analysis means for receiving imaging information that is transmitted from the terminal, analyzing the received imaging information, thereby to get an imaging object or an imaging condition, and obtaining image correction information that corresponds to this imaging object or imaging condition from storage means having the image correction information for correcting the image data stored; and transmission means for transmitting the image correction information obtained in the imaging information analysis means to the terminal.

The twenty-sixth invention for solving the above-mentioned problem, which is a program of an information processing unit for, after correction-processing photo image data that is transmitted from a terminal, transmitting it to the terminal, is characterized in causing the information processing unit to function as: imaging information analysis means for receiving imaging information that is transmitted from the terminal, analyzing the received imaging information, thereby to get an imaging object or an imaging condition, and obtaining image correction information that corresponds to this imaging object or imaging condition from storage means having the image correction information for correcting the image data stored; image processing means for, based upon the image correction information obtained in the imaging information analysis means, correction-processing the received image data; and transmission means for transmitting the image data correction-processed in the image processing means to the terminal.

In this present invention, at first, as shown in FIG. 1, an image sensor 1 such as a camera images the imaging object and obtains image data. On the other hand, an imaging information obtainment unit 2 obtains imaging information that is information at the time of imaging. Herein, the imaging information that is obtained in the imaging information obtainment unit 2 is, for example, an imaging location, an imaging date, weather at the time of imaging, an imaging angle or direction, a view angle of an imaging lens, etc.

Further, a storage unit 3 has image correction information for correcting the photo image contained. Additionally, the image correction information includes, for example, not only color corrections such as a white balance, luminosity, and chroma of the image, but also processing of the image data itself such as contour emphasis.

An imaging information analysis unit 4 analyzes the imaging information given from the imaging information obtainment unit 2 and reads out image correction information appropriate for the photo image from the storage unit 3. And, an image processing unit 5 subjects the image data of the imaging object obtained by the image sensor 1 to a correction process based upon the image correction information obtained by the imaging information analysis unit 4.

Effects of the Invention

In accordance with the present invention, imaging information such as location information and date information is obtained, this imaging information is analyzed, and the photo image is subjected to an image correction according to the appropriate image correction information that is obtained based upon an analysis result without causing a photographer to performing a special operation, thereby enabling a person as well, who has no knowledge about the image process, to easily get the photo image that is wonderful.

Further, the present invention, which is configured to analyze the imaging information such as the location information and the date information, thereby to get the imaging object or the imaging condition, and to obtain the image correction information from this imaging object or imaging condition, makes it possible to perform the appropriate correction process for the photo image even in case of the multifarious imaging objects, or the complicated imaging conditions, which is different from the simplified image correction technology of performing an image correction without recognizing a specific imaging object or imaging condition as is the case of the prior art.

DESCRIPTION OF NUMERALS 1 image sensor
2 imaging information obtainment unit
3 storage unit
4 imaging information analysis unit
5 image processing unit

BEST MODE FOR CARRYING OUT THE INVENTION

Figure 1:
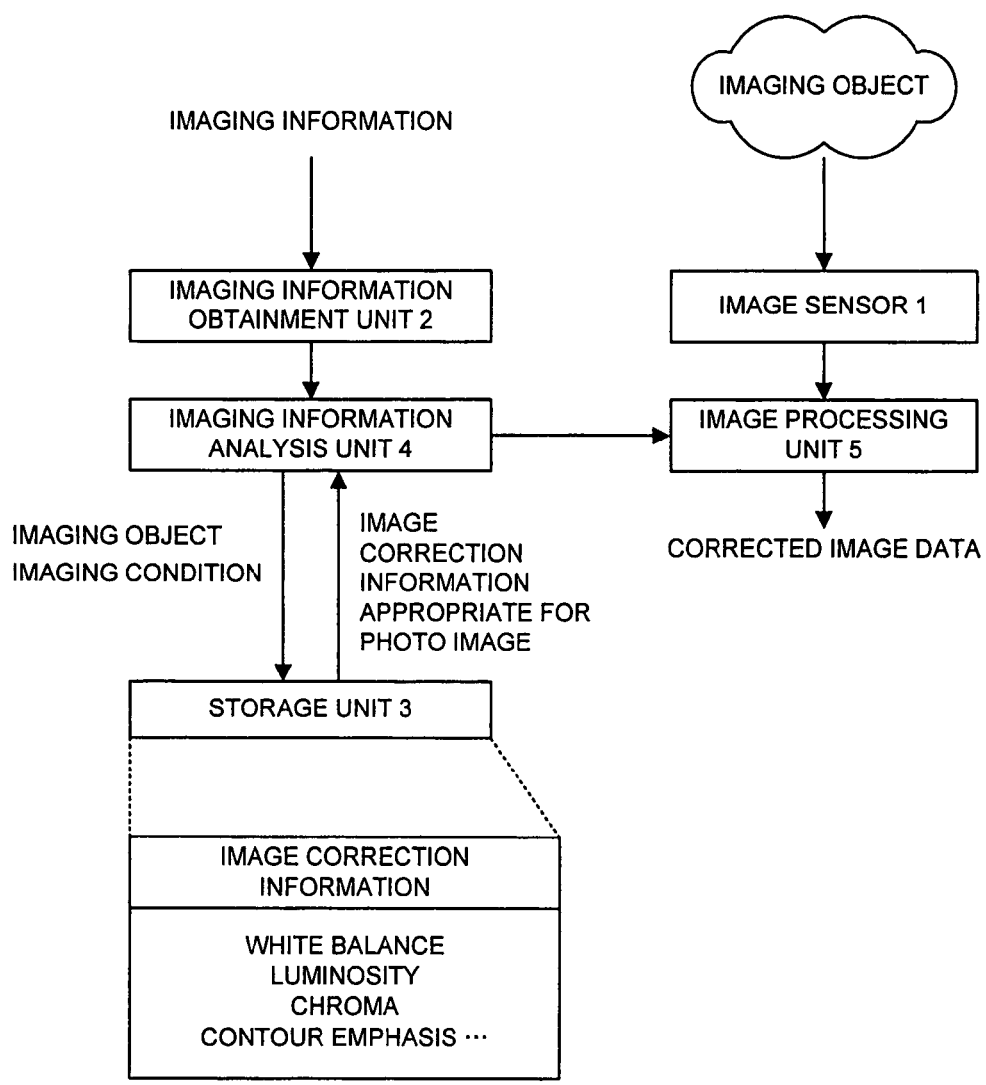
FIG. 1 is a view for explaining an outline of the present invention.
Figure 2:
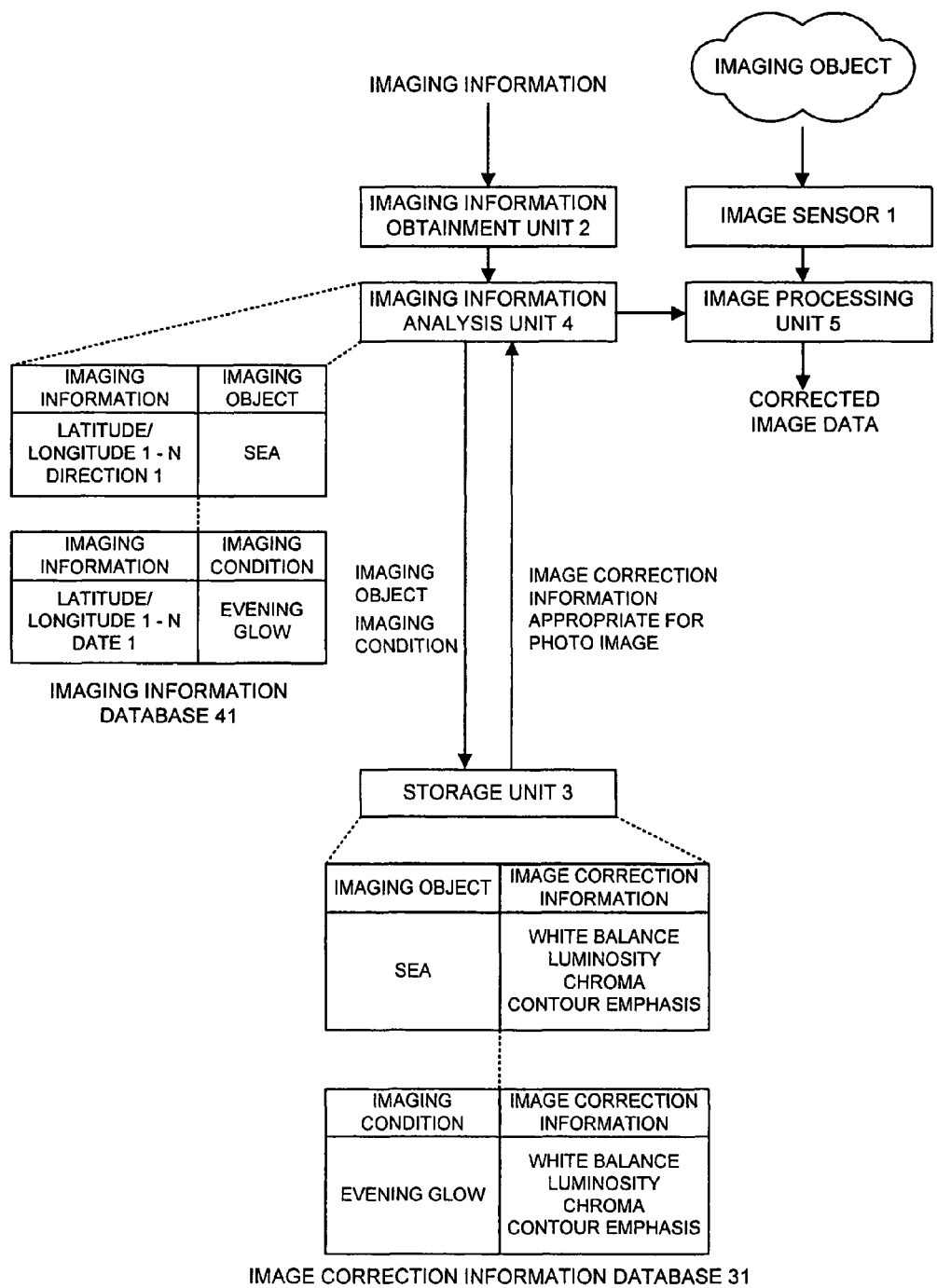
FIG. 2 is a view for explaining an outline of an embodiment of the present invention.

At first, an outline of the best mode for carrying out the present invention will be explained in details by making a reference to FIG. 2. Additionally, an identical numeral is affixed to a component similar to that of the foregoing FIG. 1.

In the present invention, an image sensor 1 such as a camera images the imaging object, and obtains image data. On the other hand, an imaging information obtainment unit 2 obtains imaging information that is information at the time of imaging. Herein, the imaging information that is obtained in the imaging information obtainment unit 2 is, for example, an imaging location, an imaging date, weather at the time of imaging, an imaging angle or direction, etc.

An imaging information analysis unit 4 includes an imaging information database 41 having an imaging object or an imaging condition stored that corresponds to the imaging information so as to analyze the imaging information given from the imaging information obtainment unit 2. For example, the imaging information database 41 has information such as latitude/longitude and a direction, and information of the imaging object stored correspondingly. Further, it has information such as latitude/longitude, a direction, and a date, and information of the imaging conditions such as morning, a night scene, front light, and backlight stored correspondingly.

Owing to such an imaging information database 41, the imaging information analysis unit 4 retrieves information that corresponds to the imaging information (for example, information such as latitude/longitude, a direction and a date) given from the imaging information obtainment unit 2 from the imaging information database 41, and gets the imaging object and the imaging condition caused to correspond to this information. The imaging object or the imaging condition can be pin-pointedly determined in such a manner that, for example, the imaging object can be determined to be sea from information such as latitude/longitude and a direction, or the imaging condition is determined to be evening glow from information such as latitude/longitude, a direction and a date.

Additionally, it is not always necessary that the imaging information database 41 has plural kinds of imaging information and the imaging condition or the imaging object caused to correspond to each other at one versus one, and it may store one kind of information and auxiliary information for obtaining the imaging condition or the imaging object correspondingly. And, a configuration may be made so that the imaging information analysis unit 4 gets the imaging condition or the imaging object based upon plural kinds of auxiliary information obtained from the imaging information. For example, a configuration may be made so that in a case where the imaging information analysis unit 4 searches the imaging information database 41, obtains the auxiliary information such as a high mountain from the positional information, and obtains the auxiliary information such as winter from the date information, it determines from a combination of a high mountain and winter that the imaging object is a snowy mountain.

A storage unit 3 includes an image correction information database 31 having image correction information for correcting a photo image, and an imaging object or an imaging condition, to which this image correction information is applied, stored correspondingly. Additionally, the image correction information includes, for example, not only color corrections such as a white balance, luminosity, and chroma of the image, but also processing of the image data itself such as contour emphasis.

And, as described above, the imaging information analysis unit 4 analyzes the imaging information given from the imaging information obtainment unit 2, gets an imaging object or an imaging condition, and reads out the image correction information that corresponds to this imaging object or imaging condition from the storage unit 3. An image processing unit 5 subjects the image data of the imaging object obtained by the image sensor 1 to a correction process based upon the image correction information obtained by the imaging information analysis unit 4.

Additionally, the imaging information database 41 of the imaging information analysis unit 4 and the image correction information database 31 may be collected into one database to contain this database into the storage unit 3. In this case, the imaging information analysis unit 4 makes a reference to the database of the storage unit 3, thereby to read out the image correction information.

Next, a first embodiment of the present invention based upon the foregoing outline will be explained in details by making a reference to FIG. 3. Additionally, an identical numeral is affixed to a component similar to that of the foregoing FIG. 1 and FIG. 2.

Figure 3:
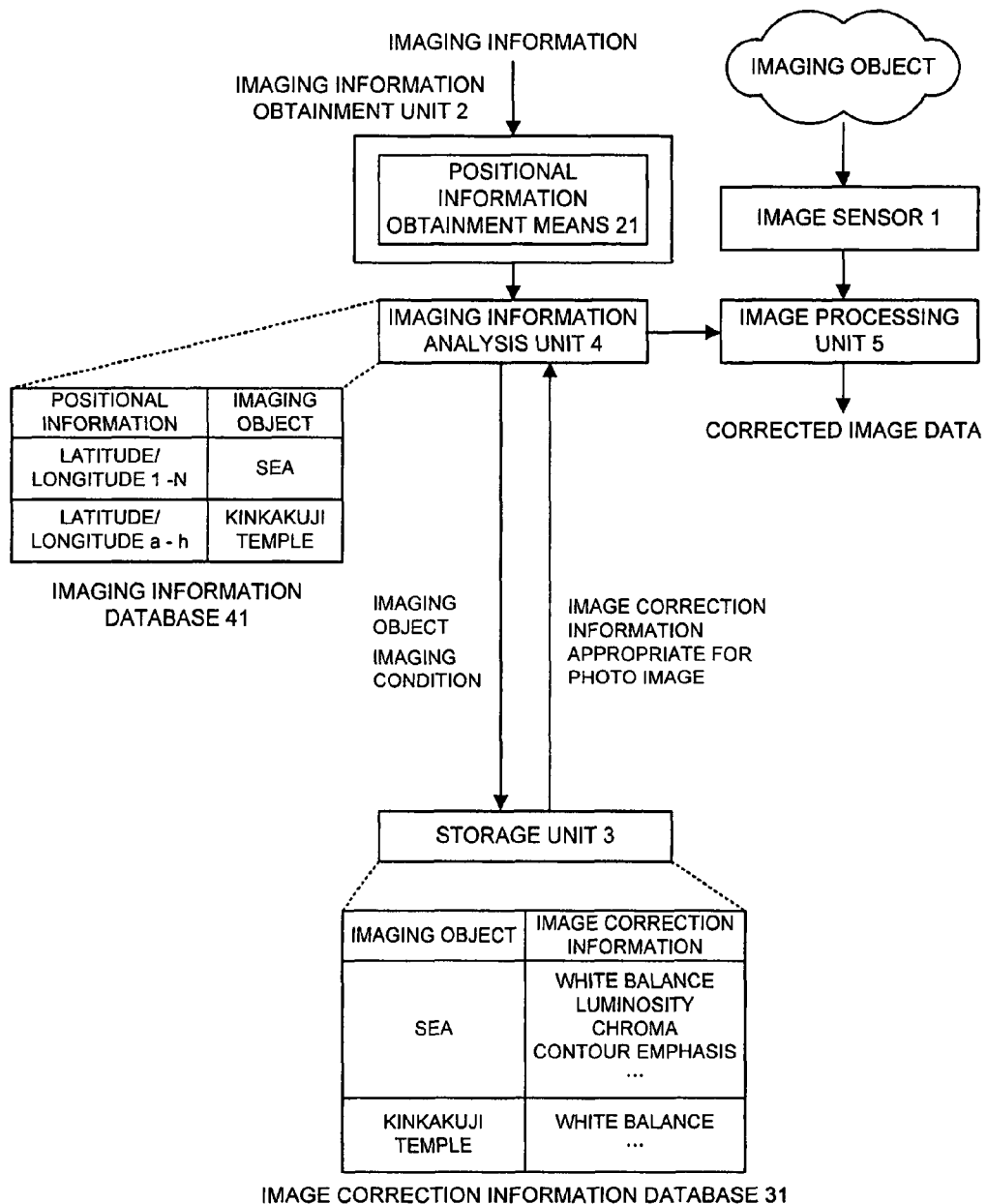
FIG. 3 is a view for explaining an outline of a first embodiment of the present invention.

The present invention, as shown in FIG. 3, includes an image sensor 1 such as a camera, an imaging information obtainment unit 2 for obtaining imaging information that is information at the time of imaging, a storage unit 3 having image correction information for correcting a photo image and an imaging object stored correspondingly, an imaging information analysis unit 4 for analyzing the imaging information given from the imaging information obtainment unit 2 to get the imaging object, and for obtaining the image correction information that corresponds to this imaging object from the storage unit 3, and an image processing unit 5 for, based upon the correction information obtained in the imaging information analysis unit 4, subjecting the image data of the imaging object obtained by the image sensor 1 to a correction process.

The image sensor 1 is an imaging apparatus having various functions necessary for the imaging, for example, a single-lens reflex camera, a digital camera, a digital video camera, a mobile telephone with a camera, and a USB camera.

The imaging information obtainment unit 2 is equipped with positional information obtainment means 21, and positional information obtainment means 21, which is for obtaining an imaging position of the image, obtains information associated with the imaging position and the imaging direction as GPS information, for example, by utilizing an electromagnetic wave for positioning from a GPS satellite. Herein, the so-called imaging position is a position in which the imaging apparatus exists, and is expressed by latitude and longitude. On the other hand, the so-called imaging direction is a direction in which the imaging apparatus faces the imaging object. Additionally, an electronic direction magnet etc. may be mounted to obtain the imaging direction so that a direction to which a lens of the image sensor 1 points can be recognized.

The storage unit 3 is a medium having an image correction information database 31 having image correction information for correcting a photo image and an imaging object to which this image correction information is applied stored correspondingly. The image correction information, which is for expressing a correction parameter optimal for the imaging in some tourist attraction, has been stored correspondingly to the imaging object (herein, a building name) in the storage unit 3. For example, in a case where the imaging object (herein, a building name) is Kinkakuji temple, the storage unit 3 has stored the image correction information that allows a building of Kinkakuji temple to be clearly viewed as the image correction information.

The imaging information analysis unit 4 is for analyzing the imaging object based upon the positional information, and for reading out the image correction information that corresponds to this imaging object from the storage unit 3. Specifically, as shown in FIG. 3, the imaging information analysis unit 4, for each certain positional information, pre-stores the building name (imaging object) that exists there into the imaging information database 41, and gets the building name (imaging object) that corresponds to the positional information obtained in the positional information obtainment means 21 from the imaging information database 41. And, it reads out the image correction information that corresponds to this building name (imaging object) from the image correction information database 31 of the storage unit 3.

For example, if the positional information is latitude/longitude a, the imaging information analysis unit 4 analyzes the imaging object, thereby to determine that it is Kinkakuji temple, and reads out the image correction information that corresponds to Kinkakuji temple (imaging object) from the image correction information database 31 of the storage unit 3.

Additionally, making a configuration so as to obtain view angle information as well of a lens employed for the imaging in addition to the positional information (the imaging location or the imaging direction) as the imaging information that is to be obtained makes it possible to more accurately analyze the imaging object. There is the case that the content of the imaging object differs depending upon the view angle of the imaging lens even though the imaging position and the imaging direction thereof are identical. For example, even in a case where Kinkakuji temple is assumed to be an imaging object, if the imaging lens is a wide-angled lens, the photo image has the other building and the natural object located with the Kinkakuji temple at the center, which allows a ratio of Kinkakuji temple over the image to be reduced. On the other hand, with a telephoto lens, a ratio of Kinkakuji temple over the image is increased, and as a matter of course, differentiating the correction information of the image of the wide-angled lens from that of telephoto lens produces a more excellent result. Thereupon, a configuration is made so that the imaging object is analyzed in such a manner that the photo images, of which the imaging object is identical, are divided into the image of a close scene and the image of a far scene according to the view angle of the imaging lens etc.

The image processing unit 5 is for optimally correcting the image data obtained from the image sensor 1 based upon the image correction information obtained from the imaging information analysis unit 4.

The effect in this embodiment is that obtaining the positional information makes it possible to automatically analyze which imaging body (imaging object) exists in its position, and to subject its imaging body (imaging object) to an optimal image correction without causing a photographer to perform a special operation.

Additionally, in the foregoing example, a configuration was made so that the image correction information database 31 of the storage unit 3 was caused to correspondingly store the building name (imaging object) and the image correction information, and the imaging information analysis unit 4 read out the image correction information that corresponded to the building name (imaging object) obtained by analyzing the imaging information.

However, the configuration is not limited hereto, and a configuration may be made so that the image correction information database 31 is caused to correspondingly pre-store the correction processes such as a white balance and sharpness, and a plurality of correction values or levels that are employed for these processes, and after the imaging information analysis unit 4 analyzes the imaging object, it reads out the correction information such as a white balance and a level of sharpness suitable for its imaging object from the image correction information database 31. For example, a configuration is made so that if the positional information is latitude/longitude 1, the imaging information analysis unit 4 analyzes the imaging object, thereby to determine that it is Kinkakuji temple, and reads out the sharpness, or the color information, which allows a color of gold, being a material of the exterior of Kinkakuji temple, to becomes optimal as the image correction information necessary for optimally correcting Kinkakuju temple from image correction information database 31 of the storage unit 3.

And, the image processing unit 5, for example, with Kinkakuju temple, performs an edge emphasis process based upon the correction information of the sharpness given from the imaging information analysis unit 4, and performs such a color correction that converts the color of the exterior of Kinkakuji temple in the image into a satisfactory golden color, based upon the color information that allows the color of gold, being a material of the exterior of Kinkakuji temple, to become optimal. As an example of the color correction method, there exists the technology of JP-P2001-092956 (SATISFACTORY COLOR CORRECTION). Additionally, the color information that the imaging information analysis unit 4 reads out may be satisfactory color information, and at this time, the image processing unit 5 converts the color of the exterior of Kinkakuji temple in the image into a satisfactory golden color.

Next, a second embodiment of the present invention will be explained.

Figure 4:
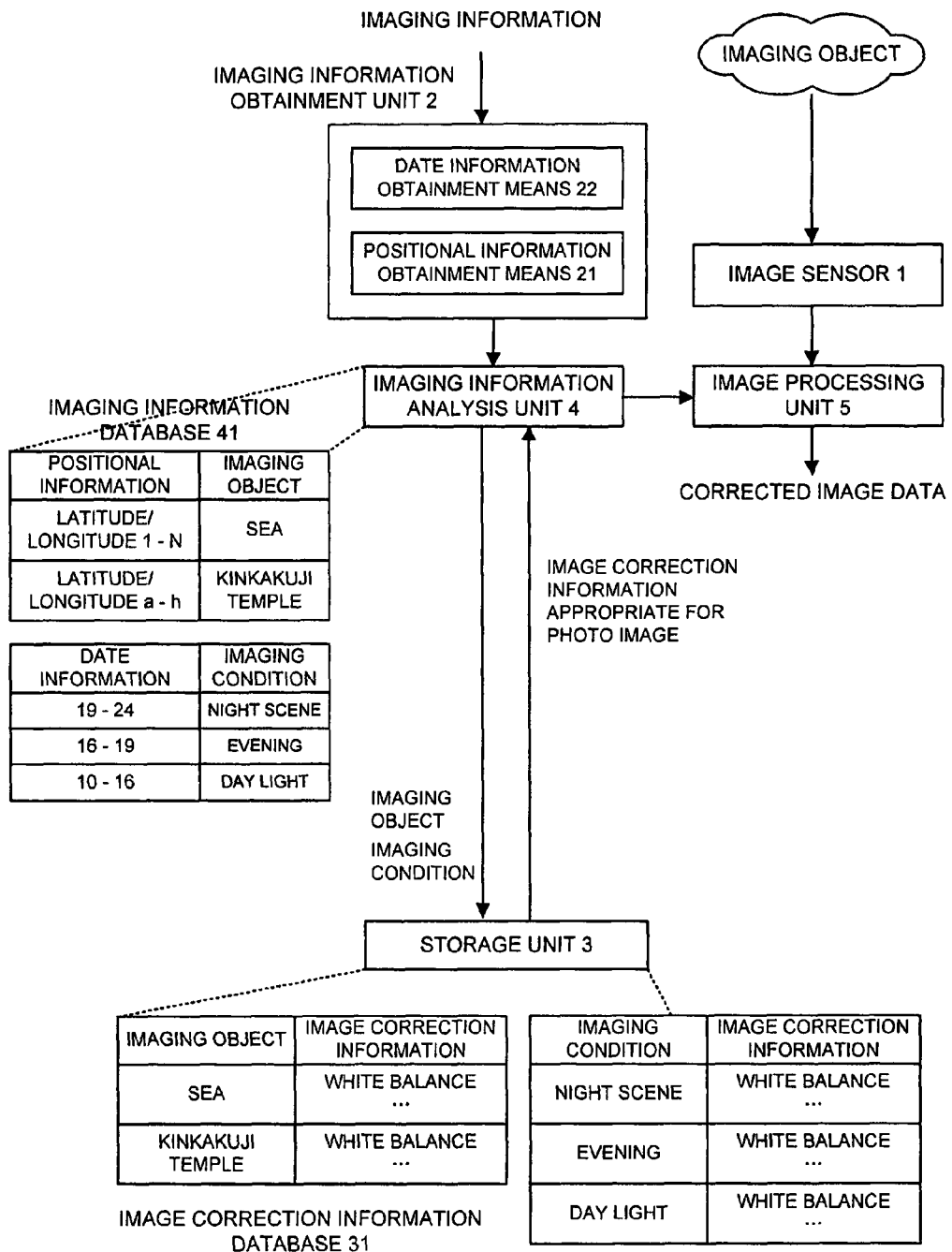
FIG. 4 is a view for explaining an outline of a second embodiment of the present invention.

FIG. 4 is a schematic block diagram illustrating a configuration of the system in accordance with the second embodiment of the present invention. Additionally, an identical numeral is affixed to a component similar to that of the first embodiment in the second embodiment, so the detailed explanation is omitted.

In the second embodiment, the imaging information obtainment unit 2 is equipped with date information obtainment means 22 in addition to the positional information obtainment means 21. The date information obtainment means 22, which is for obtaining the date at the time of having photoed the image, obtains, for example, the imaging date information from a built-in timer in the imaging apparatus. Further, the imaging apparatus having no function of building-in a timer, for example, a USB camera obtains the imaging date information from a computer etc. being a connection destination of the imaging apparatus. Or, the GPS information of the positional information obtainment means 21 may be used in substitute for the timer, thereby to obtain the imaging date information.

The storage unit 3 has the imaging condition added besides the imaging object, and based upon the positional information and data, has the image correction information suitable for correcting the image photoed in its position and date stored correspondingly hereto. For example, the image correction information database 31 of FIG. 4 has specific imaging object names or building names stored as the imaging object, and a night scene, evening, day light, etc. stored as the imaging condition. And, in a case where the imaging object is Kinkakuji temple, with image correction information thereof, the image correction information database 31 has such correction information that allows the building of Kinkakuji temple to be clearly viewed stored, and in a case where the imaging condition is a night scene, it has the correction information such as a white balance for a night scene stored.

The imaging information analysis unit 4 is for analyzing an imaging object or an imaging condition based upon the positional information and the date information, and for reading out the image correction information that corresponds to this imaging object and imaging condition from the storage unit 3. Specifically, as shown in FIG. 4, the imaging information analysis unit 4, for each certain positional information, pre-stores names of buildings (imaging objects) that exist there, and gets the imaging object that corresponds to the positional information obtained in the positional information obtainment means 21. Further, the imaging information analysis unit 4, for each certain date information, pre-stores conditions that are suitable for it, and gets the imaging condition that corresponds to the date information obtained in the date information obtainment means 22. And, it reads out the image correction information that corresponds to the imaging object or the imaging condition from the storage unit 3.

For example, if the positional information is latitude/longitude a, the imaging information analysis unit 4 analyzes the imaging object, thereby to determine that it is Kinkakuji temple, if the date information is "19 o'clock on September 25", it analyzes the imaging condition, thereby to determine that it is the night scene, and it reads out the image correction information saying that the imaging object is Kinkakuji temple, and the imaging condition is the night scene from the storage unit 3. And, the image processing unit 5 performs an edge emphasis for the image data obtained from the image sensor 1 based upon the image correction information of Kinkakuji temple and the image correction information of the night scene so that Kinkakuji temple is clearly viewed, and corrects it with a gamma correction etc. for the purpose of raising up the area that feels depressed darkly due to the nocturnal imaging.

At this time, when the imaging information analysis unit 4 is given several correction methods and these correction amounts, it may merge respective correction effects to calculate more optimal correction amount, and to assume its calculation result to be a correction amount.

In a case where, for example, plural kinds of correction information, i.e. the image correction information of Kinkakuji temple and the image correction information of the night scene are obtained, when the correction amount that is defined for the gamma correction and the sharpness, respectively, is applied as it stands, some area is corrected more than envisaged previously, whereby on the contrary, the image in which noise comes to the fore results in being produced in some cases. Thereupon, the imaging information analysis unit 4 calculates the final correction amount having the effect of the image, which is finally to be obtained, taken into consideration from the correction amounts that are defined respectively.

The effect in this embodiment is that obtaining the positional information and the date information makes it possible to automatically analyze which imaging body exists based upon its positional information, to analyze the imaging condition of its imaging body based upon its date information, and to subject its imaging body to an optimal image correction without causing a photographer to perform a special operation.

Next, a third embodiment of the present invention will be explained.

Figure 5:
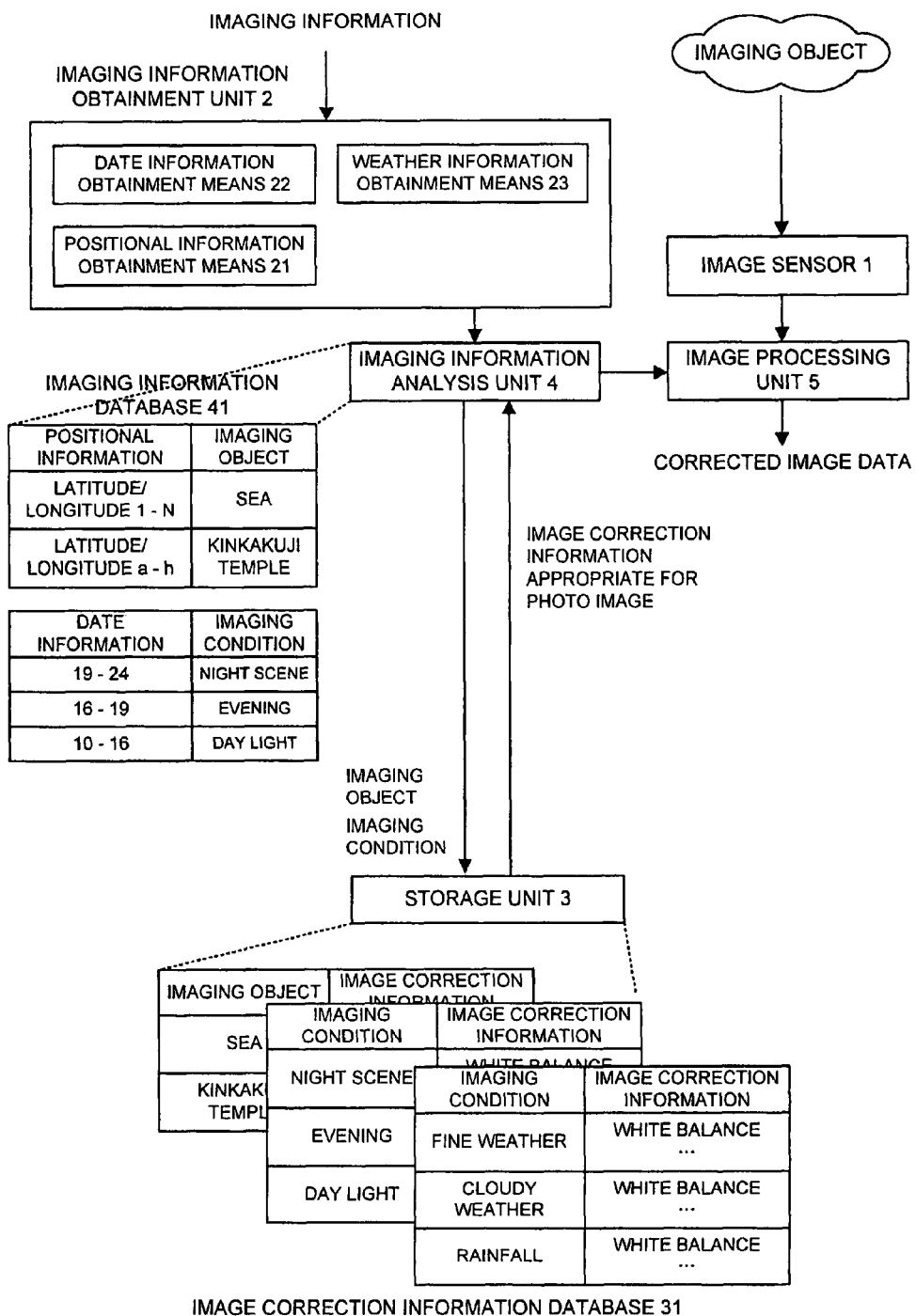
FIG. 5 is a view for explaining an outline of a third embodiment of the present invention.

FIG. 5 is a schematic block diagram illustrating a configuration of the system in accordance with the third embodiment of the present invention. Additionally, an identical numeral is affixed to a component similar to that of the first and the second embodiments in the third embodiment, so the detailed explanation is omitted.

In the third embodiment, weather information obtainment means 23 installed to the imaging information obtainment unit 2 obtains weather information at the time of the imaging. The weather information obtainment means 23 makes access to a weather information server etc. for providing weather information in the imaging position, thereby to obtain weather information in the imaging position based upon the GPS information.

The storage unit 3 has the image correction information stored that is suitable for correcting the image responding to, for example, the imaging condition saying that it is fine or cloudy at the time of imaging, in addition to the information in the foregoing first and second embodiments.

The imaging information analysis unit 4 is for analyzing an imaging information or an imaging condition based upon the positional information, the date information, and the weather information, and for reading out the image correction information that corresponds to this imaging information or imaging condition from the storage unit 3. Specifically, as shown in FIG. 4, the imaging information analysis unit 4, for each certain positional information, pre-stores the names of buildings that exist there, and gets the imaging object that corresponds to the positional information obtained in the positional information obtainment means 21. Further, the imaging information analysis unit 4, for each certain date information, pre-stores conditions that are suitable for it, and obtains the imaging condition that corresponds to the date information obtained in the date information obtainment means 22. And, it reads out the image correction information that corresponds to these imaging object and imaging condition from the storage unit 3. Further, the imaging information analysis unit 4 reads out the image correction information, which corresponds to the imaging condition such as fine weather and cloudy weather information, i.e. the weather information obtained from the weather information server etc., from the storage unit 3 based upon the positional information etc.

In a case where, for example, the positional information of the imaging information is latitude/longitude a, the date information of the imaging information is "19 o'clock on October 25", and the weather information of the imaging information is cloudy weather, the imaging information analysis unit 4 determines that the imaging object is "Kinkakuji temple", and the imaging condition is "a night scene" and "cloudy weather", respectively, and reads out the image correction information that corresponds to respective imaging object and imaging condition from the storage unit 3. And, the image processing unit 5 performs an edge emphasis for the image data obtained from the image sensor 1 based upon the obtained image correction information so that Kinkakuji temple is clearly viewed, performs a gamma correction for the purpose of raising up the area that feels depressed darkly due to the nocturnal imaging, and corrects the area imaged in a dull color because of the imaging in a cloudy sky with a chroma correction etc. so that it becomes an appropriate color.

Additionally, it is also acceptable that the storage unit 3 combines these correction-applied conditions without having them individually, and stores the image correction information appropriate for this combination, and the imaging information analysis unit 4 reads out one item of the image correction information suitable for a combination of the correction-applied conditions.

For example, it is also acceptable that assuming that Kinkakuji temple is illuminated by lighting at night for appreciating colored leaves in a fine day of the end of October, the storage unit 3 pre-stores the image correction information optimal for correcting the image of colored leaves and Kinkakuji temple illuminated by nocturnal lighting as the image correction information of the case of "Kinkakuji temple", "19 to 21 o'clock in the end of October" and "cloudy weather", and in a case where the positional information of the imaging information is latitude/longitude a, the date information of the imaging information is "19 o'clock on October 25", and the weather information of the imaging information is cloudy weather, the imaging information analysis unit 4 reads out its image correction information from the storage unit 3.

Doing so enables the image processing unit 5 to correct the image having colored leaves and Kinkakuji temple illuminated by nocturnal lighting photoed, by use of the appropriate image correction information based upon this image correction information. As an example of the correction, the satisfactory color correction is performed for only the colored leaves illuminated by nocturnal lighting so that they are tinged with red in a manner of colored leaves based upon the obtained image correction information, the edge emphasis having an effect of the lighting taken into consideration, or the gamma correction is performed for Kinkakuji temple, and the chroma correction is performed for the area imaged in a dull color because of the imaging in a cloudy sky so that it becomes an appropriate color.

Likewise, with the correction of a mountain or sea, at the time of having imaged a mountain or sea at a fine day of the middle of August, information such that the imaging position is determined to be a mountain or sea from the positional information, the imaging condition is determined to be summer and fine weather from the date information is analyzed, thereby making it possible to obtain the correction information such as the satisfactory color information optimal for green of a summer mountain or a sky over summer sea caused to correspond to its condition.

Further, it is well known that when a snowy mountain is imaged in a fair sky, the entirety of the image has a tendency to blue fogging. Thereupon, like the case of the foregoing embodiment, at the time of having photoed a snowy mountain in a fine day of the middle of February, information such that the imaging object is determined to be a mountain from the positional information, the imaging condition to be winter from the data information, the imaging object and condition to be a snowy mountain and the weather to be fine from two items of information is analyzed, whereby it is also possible that the image processing unit 5 takes the color fogging of a snowy mountain into consideration, and performs the color correction for removing the blue fogging for data of the image obtained from the image sensor 1, which has the blue fogging as a whole due to a snowy mountain, based upon the obtained image correction information.

The effect in this embodiment is that obtaining the positional information, the date information, and the weather information makes it possible to automatically analyze which imaging body exists based upon its positional information, to analyze the condition of its imaging body based upon its date information, to analyze the imaging state of the imaging body based upon the weather information, and to subject its imaging body to an optimal image correction without causing a photographer to perform a special operation.

Next, a fourth embodiment of the present invention will be explained.

Figure 6:
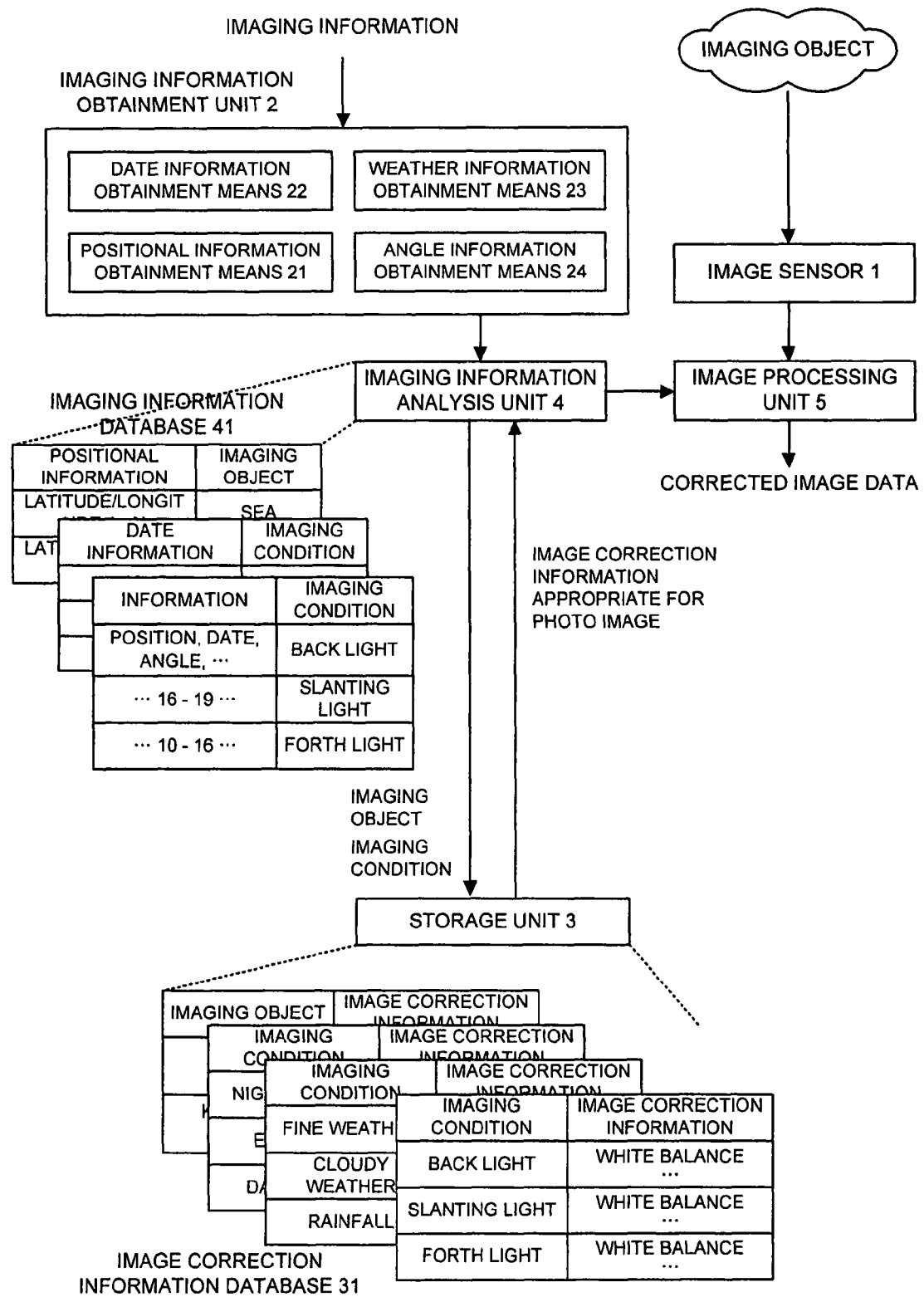
FIG. 6 is a view for explaining an outline of a fourth embodiment of the present invention.

FIG. 6 is a schematic block diagram illustrating a configuration of the system in accordance with the fourth embodiment of the present invention. Additionally, an identical numeral is affixed to a component similar to that of the first, the second, and third embodiments in the fourth embodiment, so the detailed explanation is omitted.

Angle information obtainment means 24 installed to the imaging information obtainment unit 2 obtains an angle of the imaging apparatus at the time of acquiring the image. The angle of the imaging apparatus is obtained by employing a gyro/gravity sensor etc.

The storage unit 3 has, for example, the image correction information stored that is suitable for correcting the image tinged with an imaging angle, in addition to the information in the foregoing first, second, and third embodiments. For example, even in a case of imaging identical Kinkakuji temple, the content for correcting the image also varies depending upon forth light or back light. Thereupon, the image correction information for the imaging conditions such as forth light, slanting light, and back light is also prepared in plural.

The imaging information analysis unit 4 is for analyzing the appropriate imaging object and imaging condition from the positional information that is included in the GPS information, the date information that is obtained based upon the built-in timer, the weather information that is obtained by making access to the weather information server, and the angle information that is obtained from the gravity sensor, and for reading out the image correction information that corresponds to this imaging object and imaging condition from the storage unit 3. Accordingly, the imaging information database 41, which is a database tinged with the angle information as well, is constructed so that a positional relation between the imaging location and the sun is derived from the positional information and the date information, and a positional relation between the lens of the imaging apparatus and the sun is derived from the positional information and the angle information.

Having such a database allows a positional relation between the imaging location and the sun to be analyzed from the positional information and the date information, and a positional relation between the lens of the imaging apparatus and the sun to be analyzed from the angle information according to the imaging information database 41, for example, at the time of having photoed the image about ten o'clock in a fine day of the middle of April, and in addition hereto, when fine weather is derived from the weather information, it is seen that the imaging condition is a backlight state.

At this time, the image processing unit 5 is for optimally correcting the image data obtained from the image sensor 1 based upon the image correction information obtained by the imaging information analysis unit 4. As an example of the correction method, there exists the technology of JP-P1998-040355 (METHOD FOR CORRECTING COLOR FOG) etc. For example, with Kinkakuji temple, being an imaging object, the image data obtained from the image sensor 1 is corrected to perform the image process, based upon correction quantity data of the color fog obtained from the imaging information analysis unit.

The effect in this embodiment is that obtaining the positional information, the date information, the weather information, and the angle information makes it possible to automatically analyze which imaging body exists based upon the positional information at the time of imaging, to analyze the state of its imaging body based upon the date information, to analyze the photographic matching performance of the imaging body based upon the weather information, to analyze a direction of a lens of the imaging apparatus based upon the angle information, and to subject its imaging body to an optimal image correction without causing a photographer to perform a special operation.

Additionally, the angle information may be employed as information for specifying the imaging object in addition to the positional information. For example, the imaging position can be specified from the positional information, and in addition hereto, the detailed imaging direction or imaging angle can be specified from the angle information, whereby causing the imaging information database 41 to correspondingly pre-store the positional information and angle information, and the imaging object, and in addition, causing the image correction information database 31 to correspondingly pre-store its imaging object and the image correction information of this imaging object make it possible to get the image correction information optimal for the imaging object. Specifically speaking, it is impossible to know what a sort of the composition is aimed for the imaging in imaging Kinkakuji temple. Herein, employing the angle information makes it possible to specify the imaging object in details up to the point that the image is one obtained by imaging Kinkakuji temple having a pond arranged in the foreground, or the point that the image is one obtained by imaging Kinkakuji temple having sky arranged in the background. Accordingly, with the image of Kinkakuji temple having a pond arranged in the foreground, the image correction information can be obtained that enables a feeling of water of a pond to be produced, and in addition, Kinkakuji temple to be expressed beautifully, and with the image of Kinkakuji temple having sky arranged in the background, such image correction information that enables a blue color of sky to be expressed deeply and beautifully can be obtained, and this image correction information allows the appropriate image process to be performed.

Next, a fifth embodiment of the present invention will be explained.

Figure 7:
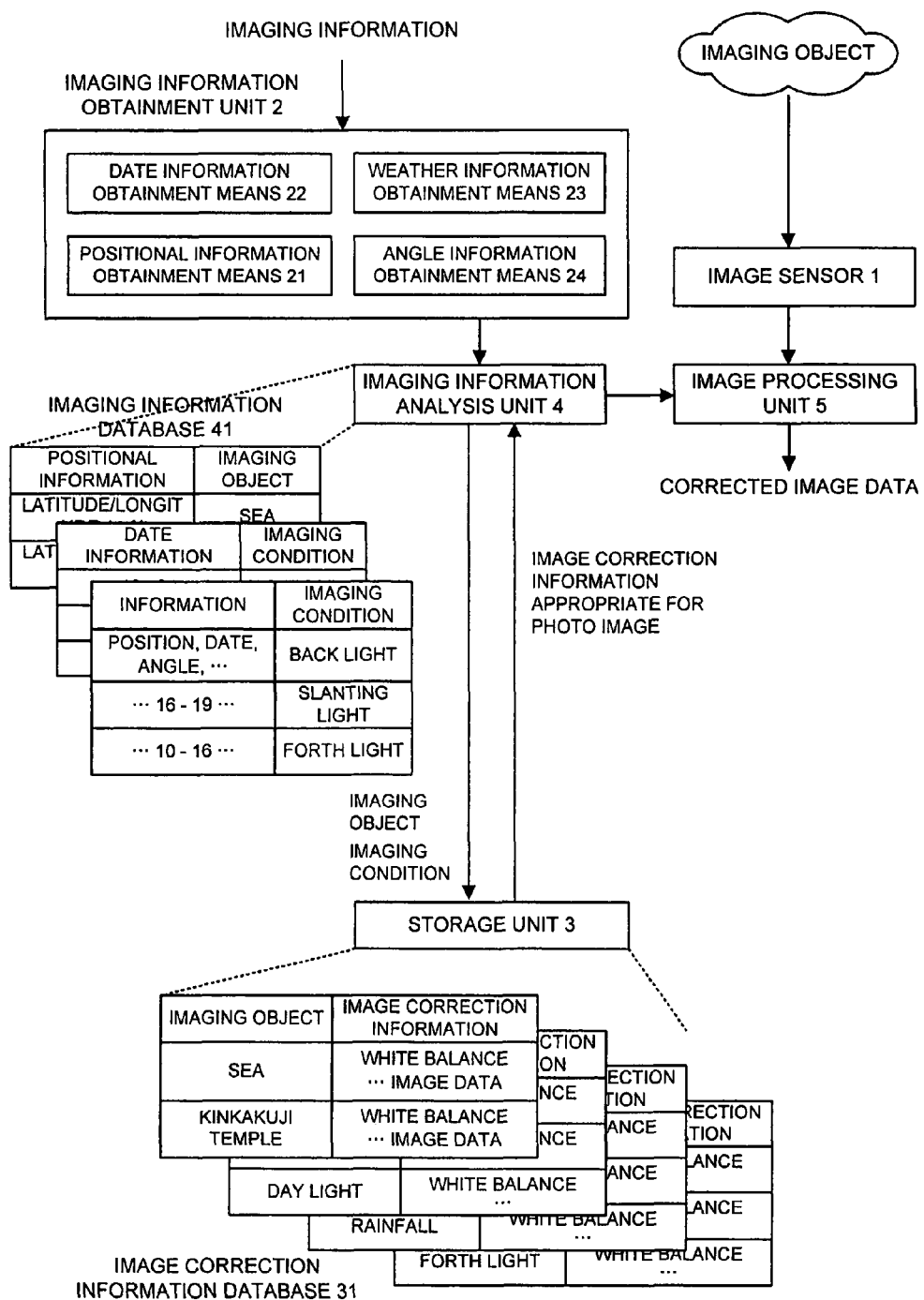
FIG. 7 is a view for explaining an outline of a fifth embodiment of the present invention.

FIG. 7 is a schematic block diagram illustrating a configuration of the system in accordance with the fifth embodiment of the present invention. Additionally, an identical numeral is affixed to a component similar to that of the first, the second, the third, and fourth embodiments in the fifth embodiment, so the detailed explanation is omitted.

In the fifth embodiment, the storage unit 3 is caused to pre-store the image data of the target as well that becomes an imaging object correspondingly to the image correction information of the imaging object. For example, in a case where Kinkakuji temple is an imaging object, the storage unit 3 pre-store reference image data of Kinkakuji temple together with the image correction information of Kinkakuji temple. Doing so makes it possible to accurately recognize the target that becomes an imaging object from the photo image by comparing the reference image data obtained together with the image correction information with the photo image data at the time of the correction by the image processing unit 5, which enables the correction process by use of the image correction information to be performed more effectively.

In addition, in a case where the reference image data of the target that the storage unit 3 is caused to pre-store is image data having optimal color information, calculating a difference with its image data makes it possible to perform the effective correction process.

Above, the embodiments of the present invention were explained, and examples having the present invention specifically applied will be explained.

Example 1

An example 1 of the present invention will be explained.

Figure 8:
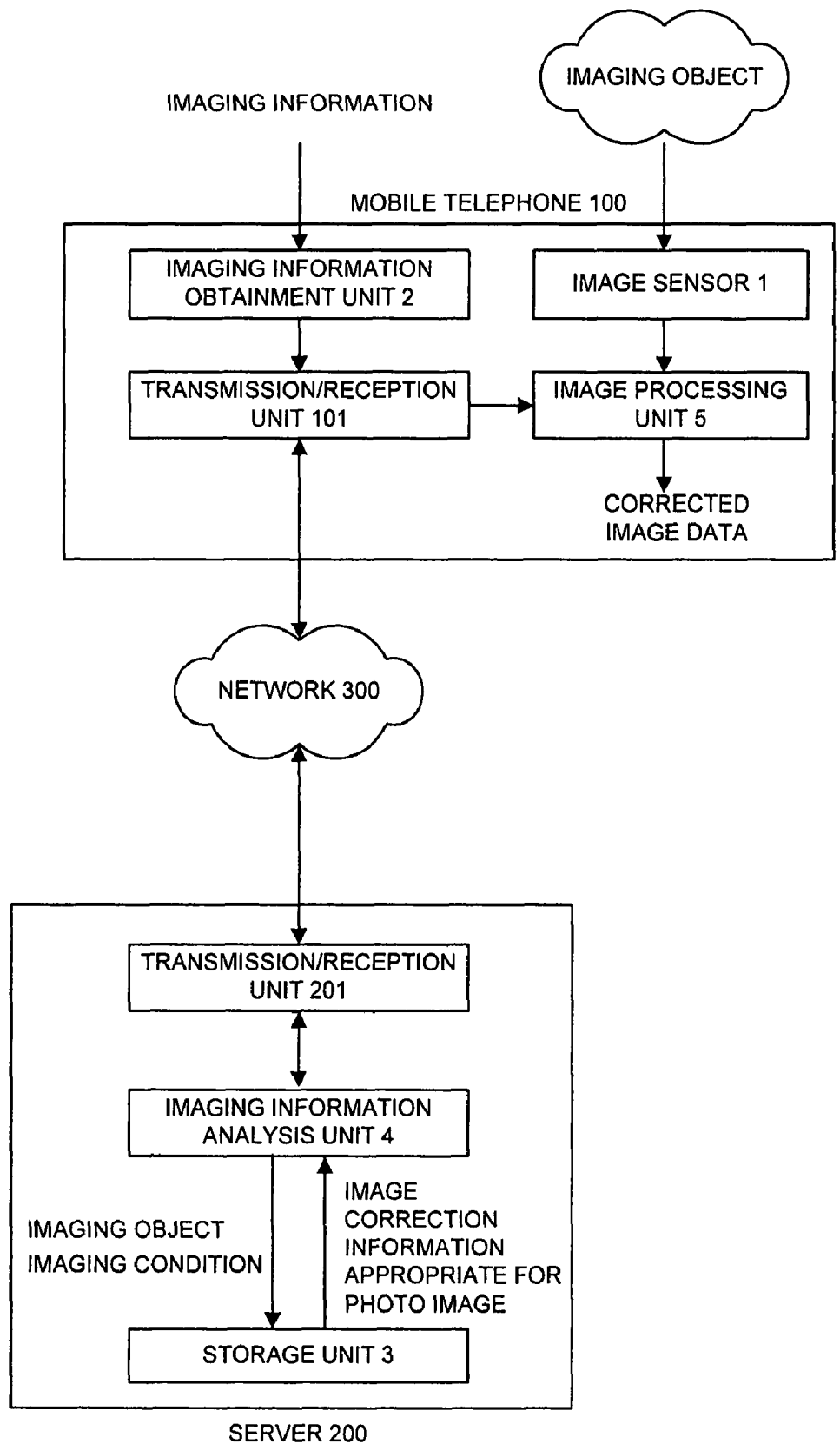
FIG. 8 is a view for explaining an outline of an example 1.

FIG. 8 is a view illustrating a configuration of the example 1 of the present invention.

As shown in FIG. 8, this system is configured of a mobile telephone 100, a server 200, and a network 300 for connecting the mobile telephone 100 and the server 200.

The mobile telephone 100 includes the foregoing image sensor 1, imaging information obtainment unit 2, and image processing unit 5, and further includes a transmission/reception unit 101 for transmitting/receiving the imaging information obtained in the imaging information obtainment unit 2 and the image correction information that is transmitted from the server 200.

The server 200 includes the foregoing storage unit 3 and the imaging information analysis unit 4, and further includes a transmission/reception unit 201 for transmitting the imaging information that is transmitted from the mobile telephone 100 and the image correction information that is transmitted to the mobile telephone 100.

In a system configured in such a manner, a user of the mobile telephone 100 photos an image with the image sensor 1 of the mobile telephone 100. Together with this, the imaging information obtainment unit 2 of the mobile telephone 100 obtains imaging information. And, the obtained imaging information is transmitted to the server 200 via the transmission/reception unit 101.

The server 200 receives the imaging information from the mobile telephone 100 via the transmission/reception unit 201, which is analyzed in the imaging information analysis unit 4 to get an appropriate correction-applied condition. And, the server 200 reads out image correction information that corresponds to this correction-applied condition from the storage unit 3, and transmits this image correction information via the transmission/reception unit 201 to the mobile telephone 100.

The mobile telephone receives image correction information from the server 200 via the transmission/reception unit 101, and the image processing unit 5 corrects the image data obtained in the image sensor 1 based upon this image correction information.

Making such a configuration enables the present invention to be applied even to such a mobile telephone that has a limit to a storage capacity etc.

Example 2

Figure 9:
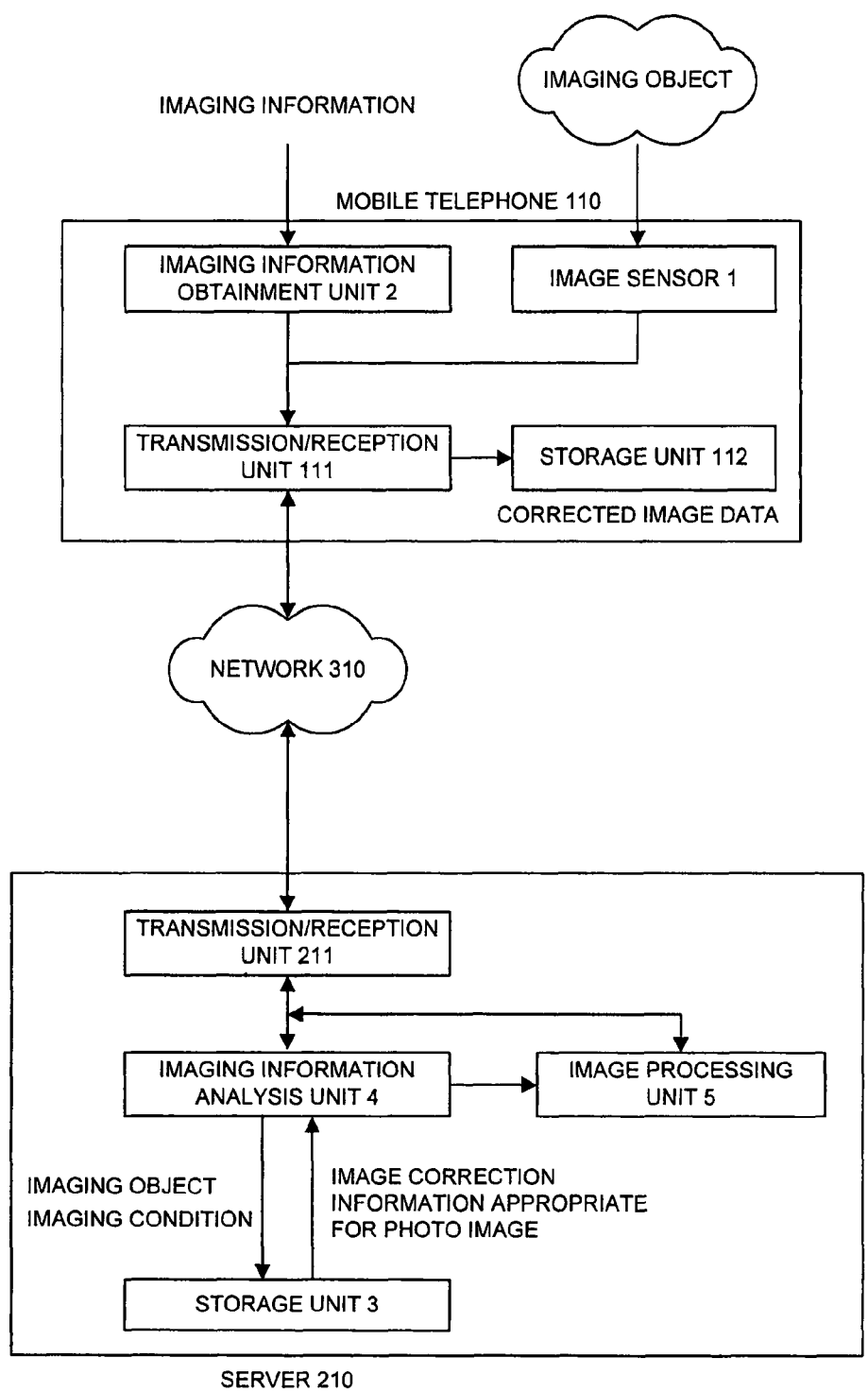
FIG. 9 is a view for explaining an outline of an example 2.

FIG. 9 is a view illustrating a configuration of the example 2 of the present invention.

As shown in FIG. 9, this system is configured of a mobile telephone 110, a server 210, and a network 310 for connecting the mobile telephone 110 and the server 210.

The mobile telephone 110 includes the foregoing image sensor 1 and imaging information obtainment unit 2, and further includes a transmission/reception unit 111 for transmitting/receiving the imaging information obtained in the imaging information obtainment unit 2 and the corrected image correction information that is transmitted from the server 210, and a storage unit 112 for containing corrected image data.

The server 210 includes the foregoing storage unit 3, imaging information analysis unit 4, and image processing unit 5, and further includes a transmission/reception unit 211 for transmitting the imaging information that is transmitted from the mobile telephone 110 and already corrected image data that is transmitted to the mobile telephone 110.

In a system configured in such a manner, a user of the mobile telephone 110 photos an image with the image sensor 1 of the mobile telephone 110. Together with this, the imaging information obtainment unit 2 of the mobile telephone 110 obtains imaging information. And, the photo image data and the obtained imaging information are transmitted to the server 210 via the transmission/reception unit 111.

The server 210 receives image data and imaging information from the mobile telephone 110 via the transmission/reception unit 211, and the imaging information analysis unit 4 analyzes the received imaging information to get an appropriate correction-applied condition. And, the server 210 reads out image correction information that corresponds to this correction-applied condition from the storage unit 3, and transmits this image correction information to the image processing unit 5. The image processing unit 5 corrects the received image data based upon this image correction information, and transmits this already corrected image data to the mobile telephone 110 via the transmission/reception unit 211.

The mobile telephone 110 receives the already corrected image data from the server 210 via the transmission/reception unit 111, which is contained into the storage unit 112.

Making such a configuration enables the present invention to be applied even to such a mobile telephone that has a low storage capacity or a low image-processing ability.

Additionally, in the foregoing examples, a configuration was made so that the image data and imaging information obtained in the mobile telephone were transmitted to the server with a communication circuit; however, a configuration may be made so that the obtained image data and imaging information are contained into memory cards such as a Compact Flash® and an SD card for the time being to deliver this memory card to the server.

Example 3

An example 3 of the present invention will be explained.

As apparent from the above explanation, it is also possible to configure the mobile telephone 100 and the server 200 in the example 1, and the mobile telephone 110 and the server 210 in the example 2 with hardware; however it is also possible to realize them with a computer program.

Figure 10:
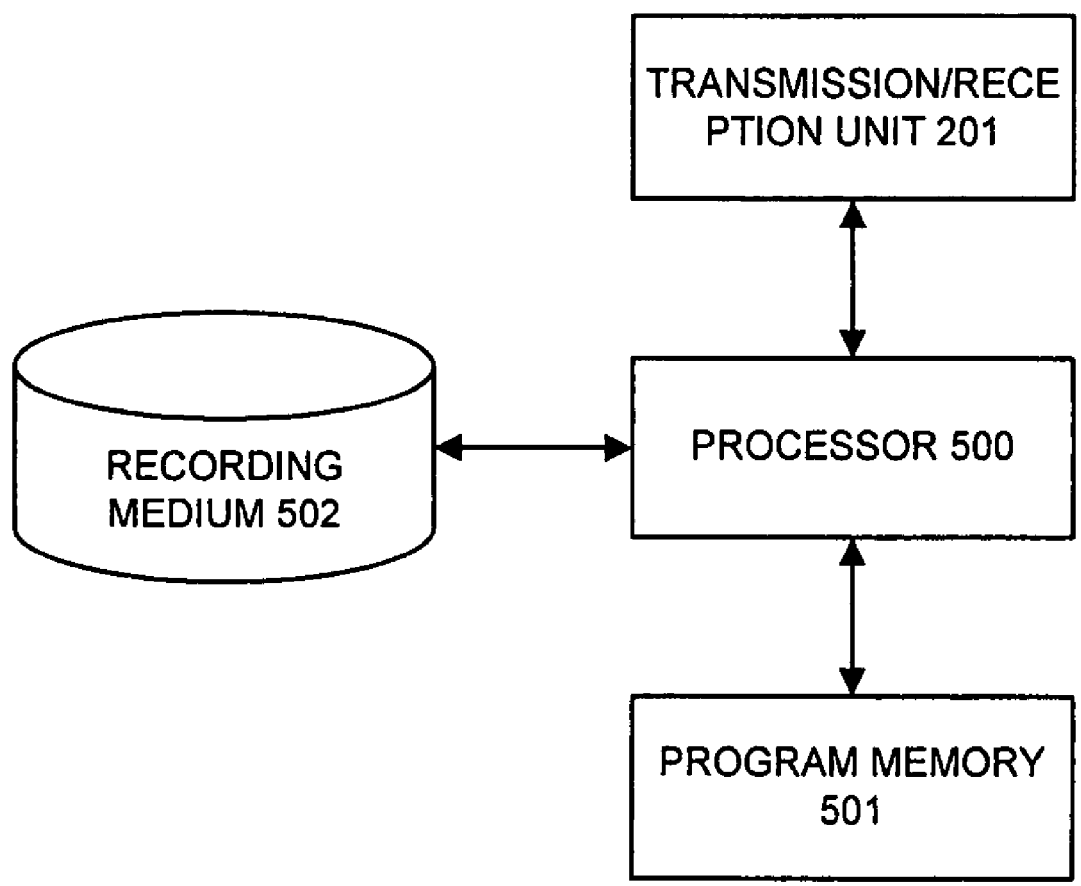
FIG. 10 is a view for explaining an outline of an example 3.
Figure 11:
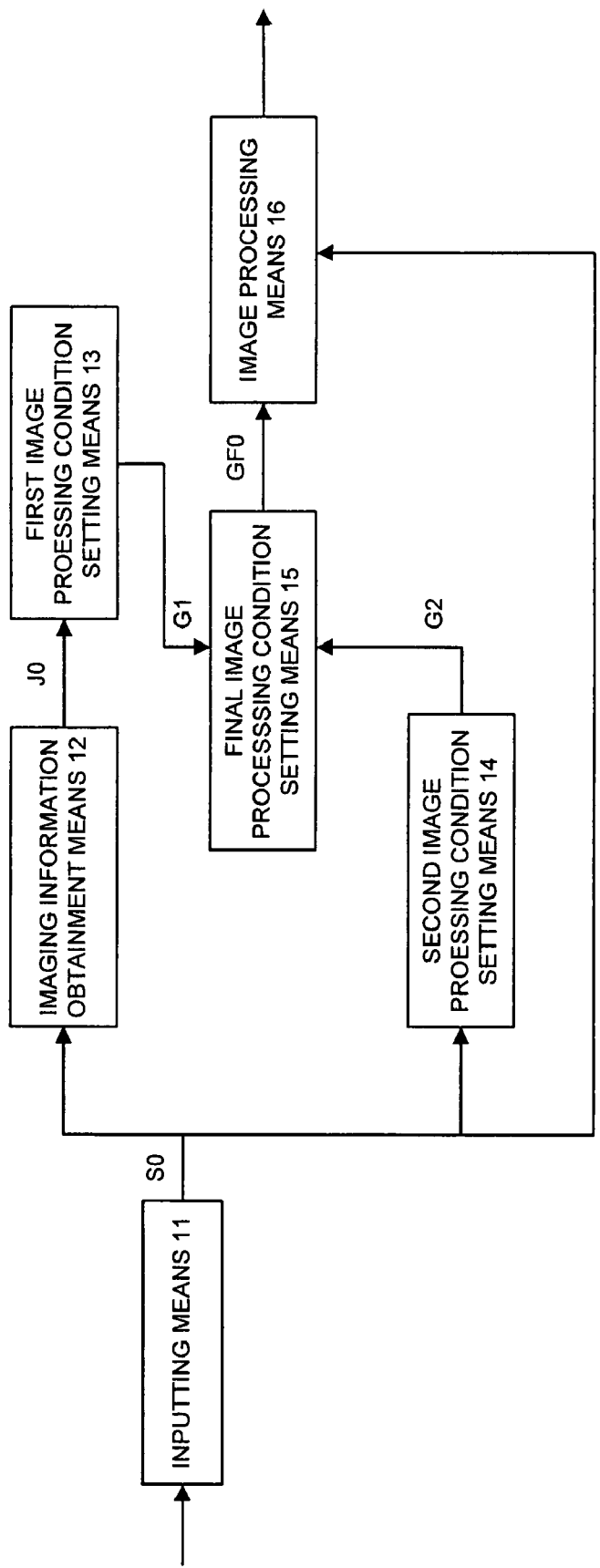
FIG. 11 is a view for explaining a prior art.

FIG. 10 is a general block configuration diagram of the information processing unit having one part of the server 200 implemented.

The information processing unit shown in FIG. 10 is comprised of a processor 500, a program memory 501, and a recording medium 502.

The recording medium 502 is equivalent to the storage unit 3, and the imaging information database 41 of the imaging information analysis unit 4 in the example 1 and the example 2. Additionally, the recording medium 502 may be a plurality of recording mediums, and may be a storage region that is comprised of an identical recording medium. The magnetic recording medium such as a hard disc can be employed as a recording medium.

The program memory 501 has a program contained for causing the processor 500 to perform the processes as the imaging information analysis unit 4 and the image processing unit 5 in the foregoing example 1 and example 2, and this program allows the processor 500 to operate and the transmission/reception unit 201 to be instructed.

It does not matter that a configuration is made so that the processor 500 performs one part of the process of the transmission/reception unit 201.

As apparent from the above explanation, it is also possible to configure one part or the entirety of the hardware with a computer program.

Additionally, with the mobile telephone 100 as well, the entirety or one part of the hardware thereof can be realized with a computer program similarly to the server 200. In this case, the entirety or one part of the imaging information obtainment unit 2 is realized with the processor 500.

The invention claimed is:

1. An image processing system comprising:
storage means having image correction information for correcting image data stored;
imaging information obtainment means for obtaining imaging information;
imaging means for, by imaging an imaging object, obtaining image data of the imaging object;
imaging information analysis means for analyzing the imaging information obtained in the imaging information obtainment means, thereby to obtain image correction information of the image data from the storage means; and
image processing means for, based upon the image correction information obtained in the imaging information analysis means, correction-processing the image data obtained in the imaging means.

2. An image processing system comprising:
storage means having image correction information for correcting image data stored;
imaging information obtainment means for obtaining imaging information;
imaging means for, by imaging an imaging object, obtaining image data of the imaging object;
imaging information analysis means for analyzing the imaging information obtained in the imaging information obtainment means to get an imaging object or an imaging condition, and for obtaining image correction information that corresponds to this imaging object or imaging condition from the storage means; and
image processing means for, based upon the image correction information obtained in the imaging information analysis means, correction-processing the image data obtained in the imaging means.

3. An image processing system comprising:
storage means having image correction information, being correction information for correcting a photo image, and an imaging object or an imaging condition, for which this image correction information is applied, stored correspondingly;
imaging information obtainment means for obtaining imaging information;
imaging means for, by imaging an imaging object, obtaining image data of the imaging object;
imaging information analysis means for analyzing the imaging information obtained in the imaging information obtainment means to get an imaging object or an imaging condition, and for obtaining image correction information that corresponds to this imaging object or imaging condition from the storage means; and
image processing means for, based upon the image correction information obtained in the imaging information analysis means, correction-processing the image data obtained in the imaging means.

4. An image processing system comprising:
an image correction information database having image correction information, being correction information for correcting a photo image, and an imaging object or an imaging condition, for which this image correction information is applied, stored correspondingly;
an imaging information database having imaging information and an imaging object or an imaging condition stored correspondingly;
imaging information obtainment means for obtaining imaging information;
imaging means for, by imaging an imaging object, obtaining image data of the imaging object;
imaging information analysis means for retrieving an imaging object or an imaging condition that corresponds to the imaging information obtained in the imaging information obtainment means from the imaging information database, and for obtaining image correction information that corresponds to this imaging object or imaging condition from the image correction information database; and
image processing means for, based upon the image correction information obtained in the imaging information analysis means, correction-processing the image data obtained in the imaging means.

5. An image processing system comprising:
storage means having image correction information for correcting image data stored;
imaging information obtainment means for obtaining imaging information;
imaging information analysis means for analyzing the imaging information obtained in the imaging information obtainment means, thereby to obtain image correction information of the image data from the storage means; and
image processing means for, based upon the image correction information obtained in the imaging information analysis means, correction-processing the image data obtained in the imaging means.

6. The image processing system according to one of claim 1 to claim 5, wherein the imaging information obtainment means is means for obtaining information of an imaging position.

7. The image processing system according to one of claim 1 to claim 6, wherein the imaging information obtainment means is means for obtaining information of an imaging date.

8. The image processing system according to one of claim 1 to claim 7, wherein the imaging information obtainment means is means for obtaining information of weather at the time of imaging.

9. The image processing system according to one of claim 1 to claim 8, wherein the imaging information obtainment means is means for obtaining information of an imaging angle.

10. The image processing system according to one of claim 1 to claim 9, wherein the image correction information is image information of the imaging object and color expression information satisfactory for this image; and the image processing means is configured to employ the image information of the imaging object at the time of the correction process, thereby to identify the imaging object, being a target, and to employ the satisfactory color expression information, thereby to correct the image of the imaging object, being a target.

11. An image processing method is characterized in obtaining imaging information at the time of imaging, analyzing this imaging information, thereby to get an imaging object or an imaging condition, retrieving image correction information that corresponds to this imaging object or imaging condition from the accumulated image correction information, and correction-processing the photo image based upon this image correction information.

12. An image processing method is characterized in obtaining imaging information at the time of imaging, analyzing this imaging information, thereby to get an imaging object or an imaging condition, retrieving image correction information that corresponds to this imaging object or imaging condition from the image correction information accumulated responding to the imaging object or the imaging condition, and correction-processing the photo image based upon this image correction information.

13. An image processing method is characterized in pre-accumulating information of a location and an image correction, searching the accumulated information based upon the imaging position, thereby to extract information of an image correction that corresponds hereto, and employing the information of the image correction, thereby to correction-process the photo image.

14. An image processing method is characterized in pre-accumulating information of a location, a date, and an image correction, searching the accumulated information based upon the imaging position and the imaging date, thereby to extract information of an image correction that corresponds hereto, and employing the information of the image correction, thereby to correction-process the photo image.

15. An image processing method is characterized in pre-accumulating information of a location, a date, weather and an image correction, searching the accumulated information based upon the imaging position, the imaging date and the weather at the time of imaging, thereby to extract information of an image correction that corresponds hereto, and employing the information of the image correction, thereby to correction-process the photo image.

16. An image processing method is characterized in pre-accumulating information of a location, a date, weather, an angle, and an image correction, searching the accumulated information based upon the imaging position, the imaging date, the weather at the time of imaging, and the imaging angle, thereby to extract information of an image correction that corresponds hereto, and employing the information of the image correction, thereby to correction-process the photo image.

17. The image processing method according to one of claim 11 to claim 16, wherein the image correction information is image information of a body, being a target, and color expression information satisfactory for this image; and the image information of the body is employed at the time of the correction to identify the body, being a target, and the satisfactory color expression information is employed to correct the image of the body, being a target.

18. An image processing system comprising:
a mobile terminal including:
imaging means for, by imaging an imaging object, obtaining image data of the imaging object;
imaging information obtainment means for obtaining imaging information; image processing means for, based upon image correction information for correcting the transmitted image data, correction-processing the image data; and
means for transmitting the imaging information obtained in the imaging information obtainment means;
and
a server including:
storage means having image correction information for correcting image data stored;
imaging information analysis means for receiving imaging information from the mobile terminal, analyzing the received imaging information, thereby to get an imaging object or an imaging condition, and obtaining image correction information that corresponds to this imaging object or imaging condition from the storage means; and
transmission means for transmitting the image correction information obtained in the imaging information analysis means to the mobile terminal.

19. An image processing system comprising:
a mobile terminal including:
imaging means for, by imaging an imaging object, obtaining image data of the imaging object;
imaging information obtainment means for obtaining imaging information; and
means for transmitting the image data obtained in the imaging means and the imaging information obtained in the imaging information obtainment means;
and
a server including:
storage means having image correction information for correcting the image data stored;
imaging information analysis means for receiving imaging information from the mobile terminal, analyzing the received imaging information, thereby to get an imaging object or an imaging condition, and obtaining image correction information that corresponds to this imaging object or imaging condition from the storage means;
image processing means for, based upon the image correction information obtained in the imaging information analysis means, correction-processing the received image data; and
transmission means for transmitting the image data correction-processed in the image processing means to the mobile terminal.

20. A mobile terminal for transmitting photo image data to an external image processing server, and causing it to perform an image process, comprising:
imaging means for, by imaging an imaging object, obtaining image data of the imaging object;
imaging information obtainment means for obtaining imaging information;
means for transmitting the image data of the imaging object and the imaging information by causing them to correspond with each other; and
storage means into which the image-processed image data transmitted from the image processing server is contained.

21. A mobile terminal for image-processing photo image data, comprising:

imaging means for, by imaging an imaging object, obtaining image data of the imaging object;

imaging information obtainment means for obtaining imaging information;

means for transmitting the imaging information; means for receiving image correction information of the photo image data that corresponds to the imaging object information; and image processing means for, based upon the obtained image correction information, correction-processing the image data.

22. A mobile terminal comprising:

imaging means for, by imaging an imaging object, obtaining image data of the imaging object;

imaging information obtainment means for obtaining imaging information;

imaging object information obtainment means for obtaining imaging object information of the imaging object; and containing means for containing the image data of the imaging object and the obtained imaging information into detachable storage means.

23. A server for transmitting image correction information for correcting photo image data to a terminal comprising:

storage means having the image correction information for correcting the image data stored;

imaging information analysis means for receiving imaging information that is transmitted from the terminal, analyzing the received imaging information, thereby to get an imaging object or an imaging condition, and obtaining image correction information that corresponds to this imaging object or imaging condition from the storage means; and transmission means for transmitting the image correction information obtained in the imaging information analysis means to the terminal.

24. A server for, after correction-processing photo image data that is transmitted from a terminal, transmitting it to the terminal, comprising:

storage means having image correction information for correcting the image data stored;

imaging information analysis means for receiving imaging information that is transmitted from the terminal, analyzing the received imaging information, thereby to get an imaging object or an imaging condition, and obtaining image correction information that corresponds to this imaging object or imaging condition from the storage means;

image processing means for, based upon the image correction information obtained in the imaging information analysis means, correction-processing the received image data; and transmission means for transmitting the image data correction-processed in the image processing means to the terminal.

25. A program of an information processing unit for transmitting image correction information for correcting photo image data to a terminal, is characterized in causing the information processing unit to function as:

imaging information analysis means for receiving imaging information that is transmitted from the terminal, analyzing the received imaging information, thereby to get an imaging object or an imaging condition, and obtaining image correction information that corresponds to this imaging object or imaging condition from storage means having the image correction information for correcting the image data stored; and transmission means for transmitting the image correction information obtained in the imaging information analysis means to the terminal.

26. A program of an information processing unit for, after correction-processing photo image data that is transmitted from a terminal, transmitting it to the terminal, is characterized in causing the information processing unit to function as:

imaging information analysis means for receiving imaging information that is transmitted from the terminal, analyzing the received imaging information, thereby to get an imaging object or an imaging condition, and obtaining image correction information that corresponds to this imaging object or imaging condition from storage means having the image correction information for correcting the image data stored;

image processing means for, based upon the image correction information obtained in the imaging information analysis means, correction-processing the received image data; and transmission means for transmitting the image data correction-processed in the image processing means to the terminal.

* * * * *